United States Patent [19]

McCormick

[11] Patent Number: 6,017,120

[45] Date of Patent: Jan. 25, 2000

[54] EYEGLASS POCKET CLIP ACCESSORY AND METHOD

[75] Inventor: William L. McCormick, Huntington, N.Y.

[73] Assignee: Opti-Grip, Inc., Huntington, N.Y.

[21] Appl. No.: 09/073,801

[22] Filed: May 6, 1998

[51] Int. Cl.[7] .................................................. G02C 5/14
[52] U.S. Cl. ........................................ 351/112; 351/111
[58] Field of Search ................................ 351/112, 121, 351/111, 41; 24/3

[56] References Cited

U.S. PATENT DOCUMENTS

| | | |
|---|---|---|
| 104,720 | 6/1870 | Farrington . |
| D. 263,479 | 3/1982 | Van Exel ................................ D16/126 |
| 1,779,015 | 10/1930 | Schmitt . |
| 1,787,830 | 1/1931 | Marvin . |
| 1,898,059 | 2/1933 | McDonald . |
| 1,973,648 | 9/1934 | Nagel ........................................... 88/41 |
| 3,883,236 | 5/1975 | Zipper ....................................... 351/112 |
| 3,994,391 | 11/1976 | Holland ......................................... 206/5 |
| 4,316,654 | 2/1982 | Allen ........................................ 351/155 |
| 4,496,224 | 1/1985 | Allen . |
| 4,541,125 | 9/1985 | Phillips ........................................ 2/10 |
| 4,662,729 | 5/1987 | Dobson ..................................... 351/123 |
| 4,771,515 | 9/1988 | Guarro ........................................... 24/3 |
| 4,809,406 | 3/1989 | Tsai ............................................ 24/3 C |
| 4,903,375 | 2/1990 | DiFranco .................................. 24/3 C |
| 4,946,125 | 8/1990 | McCarty ................................ 248/316.7 |
| 5,005,263 | 4/1991 | Barrett ....................................... 24/3 C |
| 5,123,724 | 6/1992 | Salk ........................................... 351/57 |
| 5,235,727 | 8/1993 | McCloskey ............................... 24/3 C |
| 5,351,098 | 9/1994 | McDaniels ............................... 351/112 |
| 5,355,184 | 10/1994 | Varveris ................................... 351/106 |
| 5,372,345 | 12/1994 | Schmidt ................................. 248/231.8 |
| 5,408,279 | 4/1995 | Chiou ....................................... 351/121 |
| 5,414,906 | 5/1995 | Kren .......................................... 24/3.3 |
| 5,491,878 | 2/1996 | Jamouschek .............................. 24/3.3 |

*Primary Examiner*—Hung Xuan Dang
*Attorney, Agent, or Firm*—Alfred M. Walker; Harvey Lunenfeld

[57] ABSTRACT

A clip is attached to each temple piece of a pair of eyeglass, to hold the eyeglasses within a pocket of a shirt. They are molded of thermoplastic resins such as polycarbonate or polyvinylchloride in a variety of colors to match eyeglass temple pieces such as black or brown. In addition, these clips can also be finished in a metallic tone such as gold or silver through a well known process used in packaging for cosmetics. These latter clips would closely match the temple pieces of gold or silver frames.

5 Claims, 2 Drawing Sheets

6,017,120

EYEGLASS POCKET CLIP ACCESSORY AND METHOD

FIELD OF THE INVENTION

The present invention relates to eyeglass pocket clip accessories and methods of assembling same.

BACKGROUND OF THE INVENTION

While some people wear glasses constantly, others wear them only intermittently or change from clear to tinted glasses depending on the ambient light conditions. It is desirable to have a clip attached to a temple bar of the glasses to engage the edge of a shirt pocket thereby preventing the folded glasses from falling out when bending over. Many attempts at the ideal design and method of this clip have been made over the years. Some involve modification of the temple bar or permanent attachment of the clip to the temple bar at the time of manufacture. Other attachable clips are cumbersome to mount, alter the appearance of the glasses substantially, involve expensive manufacture, provide non rigid attachment, or are conformable to a limited range of temple piece cross sections.

Among the prior art patents include U.S. Pat. No. 1,779,015 of Schmitt, which teaches temple clips that are either molded as one piece with the temple bar or attached by riveting or by a clamp form fit to the temple bar cross section. U.S. Pat. No. 1,898,059 of McDonald discloses a temple clip attached with a split barrel clamp and retained with a set screw. With respect to removable retrofit clips for eyeglass temple bars, U.S. Pat. No. 4,903,375 of DiFranco describes an inexpensive plastic clip which simply attaches to a variety of temple pieces through the use of two rubber "o" rings. This retrofit system of DiFranco '375 is not a rigid attachment however. Furthermore, U.S. Pat. No. 5,235,727 of McCloskey teaches several embodiments of an attachable pocket clip made of an elastically deformable material, such as a U-shaped spring steel clasp. Like DiFranco '375, McCloskey '727 does not teach a rigid attachment, and its U-shaped embodiment does not provide a secure fit. Different designs are used for different temple piece cross sections.

Moreover, U.S. Pat. Nos. 4,316,654 and 4,496,224, both of Allen, teach eyeglass frames with pocket clips where the frames themselves are manufactured with pocket clips attached to the rims of eyeglass lenses. U.S. Pat. No. 5,414,906 of Kren discloses an eyeglass storage clip attached to a temple piece with a dual barrel design. It consists of several parts and uses spring clips to attach to a garment or pocket.

The disadvantages of the prior art are either that the temple bar pocket clips are difficult to assemble or assemble when the eye glasses are manufactured, as in Schmitt '075, McDonald '059, Allen '654, Allen '224 or Kren '906, or that the retrofit configurations of DiFranco '375 or McCloskey '727 are flimsy and not designed for long term rigid attachments.

OBJECTS OF THE INVENTION

Therefore, the objects of the present invention are as follows:

It is an object of the present invention to provide an attachable pocket clip that is conformable to a wide variety of eyeglass temple pieces.

It is a further object of the present invention to provide a liquid adhesive attachment method for retrofit attachment of a pocket clip to a temple bar of a pair of eyeglasses.

It is yet another object of the present invention to provide an attachment pocket clip which blends in with the eyeglasses and adds minimal bulk.

It is yet another object of the present invention to provide a dry adhesive attachment method for retrofit attachment of a pocket clip for a temple bar of a pair of eyeglasses.

It is also another object of the present invention to provide an inexpensive pocket clip attachment set for retrofitting a temple bar of a pair of eyeglasses with a pocket clip that is easy for the user to attach.

It is yet another object of the present invention to provide a pocket clip specially designed for very narrow metal temple pieces.

It is yet a further object of the present invention to improve over the disadvantages of the prior art.

SUMMARY OF THE INVENTION

In keeping with these objects and others which may become apparent, the present invention relates to pocket clips which are of the general shape of molded plastic pocket clips commonly used on inexpensive pens. The clips are intended to be molded of thermoplastic resins such as polycarbonate or polyvinylchloride in a variety of colors to match eyeglass temple pieces. In addition, these clips can also be finished in a metallic tone.

According to the present invention, a pair of eyeglasses includes a pocket clip attached to one of its temple pieces, by adhesive. An alternate embodiment includes a clip including a slot for insertion of an adhesive band therethrough.

BRIEF DESCRIPTION OF THE DRAWINGS

The present invention can best be understood in conjunction with the accompanying drawings, in which.

DETAILED DESCRIPTION OF THE DRAWINGS

Figure 1:
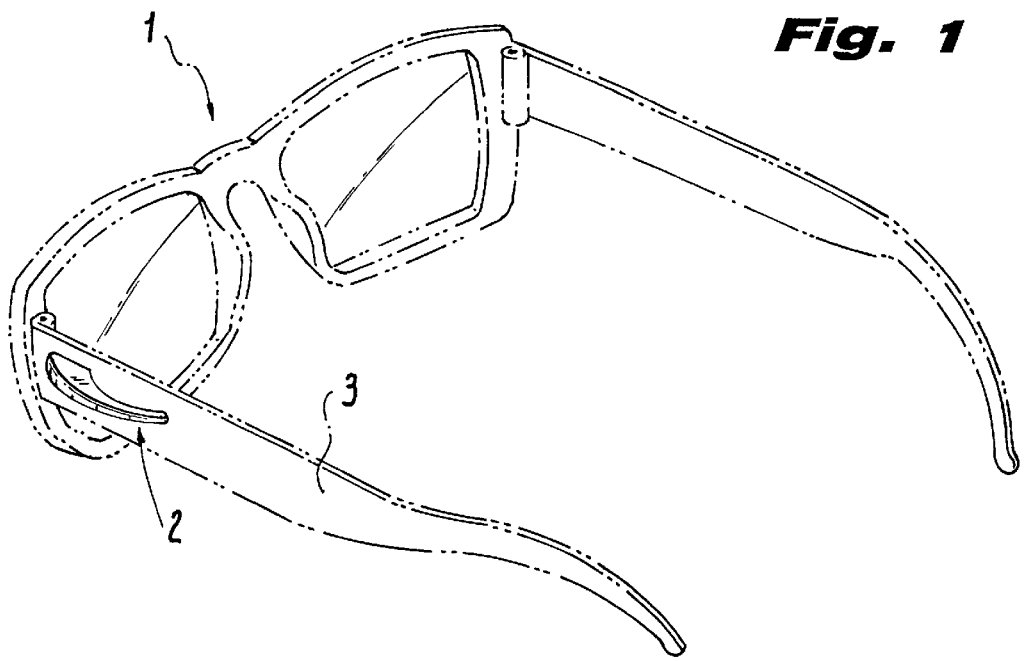
FIG. 1 is a perspective view of a pair of eyeglasses with a retrofit pocket clip attached thereto.

As shown in FIG. 1, pocket clip 2 of the present invention is of the general shape of the type of molded plastic pocket clips commonly used on inexpensive writing pens. Pocket clip 2 is intended to be molded of thermoplastic resins such as polycarbonate or polyvinylchloride in a variety of colors to match the color of eyeglass temple piece 3, such as black or brown. In addition, clip 2 can also be finished in a metallic tone such as gold or silver through a well known process used in packaging for cosmetics. Such latter clip 2 can closely match color of temple piece 3 of frame 1 of gold or silver. Structurally, pocket clip 2 includes base portion 2a having shirt pocket engaging portion 2b cantilevered from base portion 2a.

FIG. 1 shows frame 1 of a pair of eyeglasses where pocket clip 2 of the present invention has been attached to one temple piece 3 of the pair of temple pieces of frame 1.

Figure 2A:
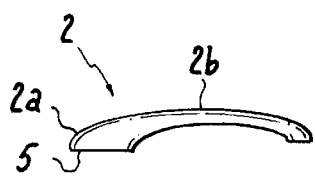
FIG. 2A is a side elevational view of a pocket clip for liquid adhesive attachment to a temple bar of a pair of eyeglasses.
Figure 2B:
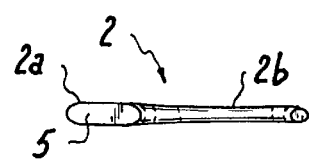
FIG. 2B is a bottom view thereof.

FIG. 2A shows a side elevational view and FIG. 2B shows a bottom view of pocket clip 2, which pocket clip 2 is attached to temple piece 3 using a small drop of liquid instant adhesive, such as cyanoacrylate, at mounting surface thereof. Clip 2 is conformable to a wide variety of temple pieces, even quite narrow metallic ones.

While the clip shown in FIG. 2 is inexpensive, non obtrusive and functional, the attachment method involves the use of a liquid adhesive that the buyer may not have. In addition, the adhesive has limited shelf life, and the user must be familiar with its tendency to "glue fingers together".

Figure 3A:
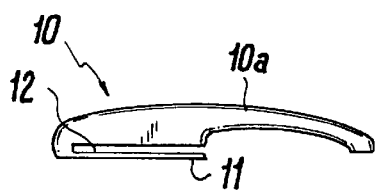
FIG. 3A is a side elevational view of a pocket clip for dry adhesive attachment, to a temple bar of a pair of eyeglasses.
Figure 3B:
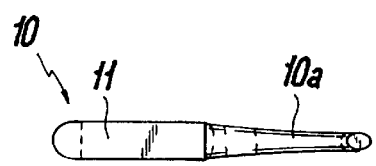
FIG. 3B is a bottom view thereof.

A second embodiment shown in FIG. 3 uses a combination of dry adhesives (ie.—tapes) to accomplish the attachment of pocket clip 10 to temper bar 3. This also facilitates the packaging of the clip with the attachment materials as an inexpensive complete retrofit kit, since it would be more expensive to package clip 2 of FIG. 2 with liquid adhesive.

Clip 10 of FIG. 3 is also a molded clip of a similar shape to that of clip 2, but clip 10 it has larger base area 11 for mounting clip 10 upon temple bar 3. Clip 10 also includes slot 12 to accept some high bond transparent tape strip 16. Clip 10 also includes cantilevered shirt pocket engaging portion 10a By using a combination of dry adhesive types, the best features of each is used to accomplish a rigid permanent bond.

Figure 4:
FIG. 4 is a top plan view of die-cut double sided high bond tape, used with a dry adhesive attachment embodiment for a pocket clip for a temple bar of a pair of eyeglasses.
Figure 5:
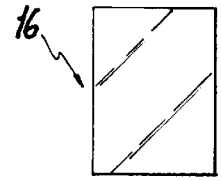
FIG. 5 is a top plan view of a transparent high bond tape member with a release liner, used with the dry adhesive attachment embodiment as in FIG. 4.

FIG. 4 shows a top view of double sided tape strip 15, which is a die cut piece of double sided high-bond tape with release liners on both top and bottom surfaces. Double sided tape strip 15 is cut to the exact size of mounting surface 11 of clip 10. As shown in FIG. 5, also included in the kit is a short piece of high bond single-sided transparent strip tape 16, having a release liner. Both types of dry adhesive tape strips 15,16 are made by 3-M Company, and single-sided transparent tape strip 16 is marketed as "3-M Super Bond" tape.

The attachment method for attaching pocket clip 10 to temple bar 3 involves the following simple steps:

1. One release liner is detached from die cut double sided tape strip 15.
2. Double sided strip 15 is attached to mounting surface 11 of clip 10.
3. The other release liner is removed from double sided tape strip 15 and pocket clip 10 is attached to temple bar 3.
4. The release liner is removed from single sided transparent tape strip 16.
5. Single sided transparent tape strip 16 is placed in slot 12 of clip 10 with the adhesive face down.
6. Single sided transparent tape strip 16 is then tightly wound around temple bar 3 and trimmed appropriately.

Figure 6:
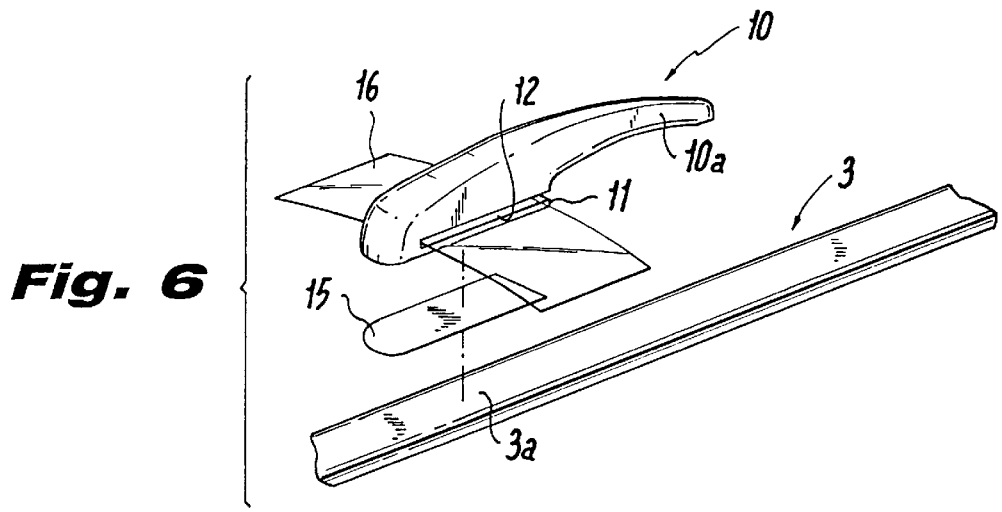
FIG. 6 is an isometric exploded view showing a dry adhesive attachment method for the pocket clip as in FIGS. 3A and 3B herein.

FIG. 6 shows an exploded view of the relative position of the various components during the process just described.

Figure 7:
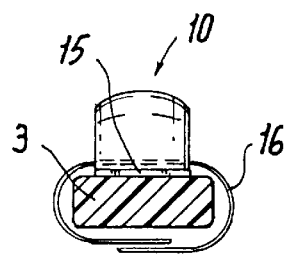
FIG. 7 is an end view of a retrofit pocket clip with the temple piece shown in cross section.

FIG. 7 shows an end view in partial cross section of pocket clip 10 attached to temple bar 3, with double sided tape strip 15 located between pocket clip 10 and temple bar 3. Single sided transparent tape strip 16 ends up wound around temple bar 3 but is shown away from temple bar 3 for clarity.

By using double sided tape strip 15, pocket clip 10 is resistant to shear forces, but the peel strength is not very high. To compensate for this disadvantage of double sided tape strip 15, transparent tape strip 16 has very good tensile strength, which prevents pocket clip 10 from being peeled off temple bar 3. However, single sided tape strip 16 does not resist shear forces or twisting very well. Therefore, the combination of both tape strips 15,16 provides a rigid permanent attachment. Furthermore, the use of slot 12 for insertion of single sided tape 16 insures a neat appearance with an unbroken top surface on pocket clip 10.

Figure 8:
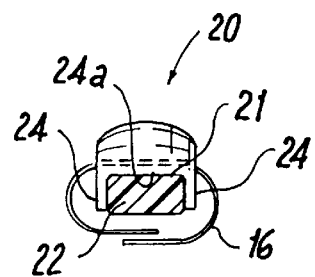
FIG. 8 is an end view, a first alternate embodiment of a retrofit pocket clip, with the temple piece in cross section of clip for narrow metal temple pieces shown mounted with a dry adhesive.
Figure 9:
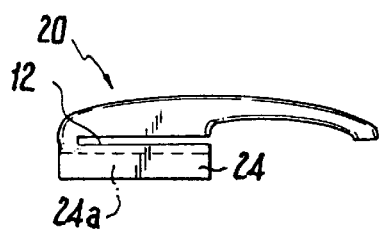
FIG. 9 is a side elevational view of a second alternate embodiment for a retrofit pocket clip for eyeglasses, with narrow metal temple pieces, wherein a user uses a dry adhesive mounting method.

While pocket clip 10 of the last embodiment shown in FIGS. 3–7, will attach well to very narrow metal temple pieces, a special further embodiment for these types which attach even more aggressively is shown in FIGS. 8 and 9.

Therefore, FIGS. 8 and 9 show two different views of such further embodiment of pocket clip 20. Pocket clip 20 is slightly narrower than pocket clip 10 and pocket clip 20 has two downwardly extending skirts 24, which skirts 24 form a groove that accepts narrow metal temple bar 22.

In this embodiment shown in FIGS. 8 and 9, the die cut double sided tape strip 21 is now much narrower and fits inside groove 24a between respective side skirts 24. Thereafter, single sided transparent tape strip 16 is placed in slot 12 as in the previous embodiment shown in FIGS. 3–7. The attachment method of FIGS. 8 and 9 is similar to that of the last embodiment shown in FIG. 3–7, using clip pocket 10.

Figure 10:
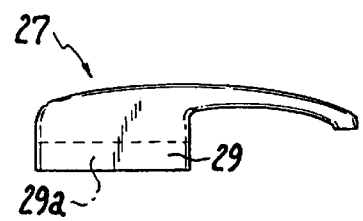
FIG. 10 is a side view of a third alternate embodiment for a retrofit pocket clip for eyeglasses with narrow metal temple pieces shown using a liquid adhesive mounting method.

A final further embodiment for pocket clip 27 is shown in FIG. 10. In this embodiment, pocket clip 27 is similar in configuration to pocket clip 20 but pocket clip 27 does not have a slot similar to slot 12. This embodiment of FIG. 10 is for liquid adhesive attachment to very narrow metal temple bars.

Figure 11:
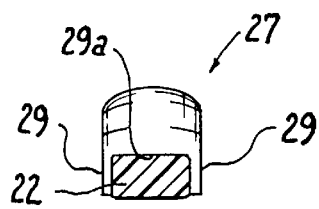
FIG. 11 is a cross sectional view of the embodiment shown in FIG. 10.

As shown in FIG. 11, it should be appreciated that a drop of instant liquid adhesive in groove 29a formed between respective skirts 29 of pocket clip 27 strongly attaches pocket clip 27 to temple bar 22, since the adhesive bonds on three sides to inside surfaces of respective skirts 29 and pocket clip 27.

It is further noted that other modifications may be made to the present invention without departing from the scope of the present invention, as noted in the appended claims.

I claim:

1. An eyeglass pocket clip accessory, wherein said pocket clip engages the edges of a shirt pocket, said pocket clip accessory comprising:

a pocket clip member attachable to a temple bar of the eyeglasses to engage the edge of the shirt pocket, said pocket clip including a base having a cantilevered shirt engaging portion extending therefrom, wherein said pocket clip is attached to one of the temple piece, by using at least one drop of liquid instant adhesive at a mounting surface thereof.

2. The eyeglass pocket clip accessory as in claim 1 wherein said adhesive is cyanoacrylate.

3. An eyeglass pocket clip accessory, wherein said pocket clip engages the edges of a shirt pocket, said pocket clip accessory comprising:

a pocket clip member attachable to a temple bar of the eyeglasses to engage the edge of the shirt pocket, said pocket clip including a base having a cantilevered shirt engaging portion extending therefrom, wherein said base of said pocket clip includes a slot accepting a strip of single sided adhesive tape, said pocket clip further having a strip of double sided adhesive tape attachable on one side to said base of said pocket clip and in another side to said temple bar.

4. A method of assembling a pocket clip to a temple bar of a pair of eyeglasses comprising the steps of:

detaching a one release liner from a strip of double sided tape, attaching said double sided tape to a base surface of said pocket clip, removing another release liner from said strip of double sided tape and, attaching said clip to said temple bar, removing a release liner from a single sided tape strip, placing said single sided tape strip inside slot of said clip with the adhesive face down, winding distal ends of said single sided tape strip around temple piece and trimmed appropriately.

5. An eyeglass pocket accessory having a pocket clip engages the edges of a shirt pocket, said pocket clip comprising:

a pocket clip member attachable to a temple bar of the eyeglasses to engage the edge of the shirt pocket, said pocket clip including a cantilevered shirt engaging portion extending from a base portion, said base portion having a slot for inserting of a single side adhesive tape strip therethrough, said base attachable to the temple bar by a double sided adhesive tape strip, said base portion of said clip further having two downwardly extending side skirts which said downwardly extending side skirts form a groove that accepts the temple bar therein, said double sided adhesive tape strip also fitting inside said groove between said downwardly extending side skirts, said single sided adhesive tape strip having distal portions engagable around an outside of said temple bar.

* * * * *